(12) United States Patent
Schwartz

(10) Patent No.: US 10,188,943 B1
(45) Date of Patent: Jan. 29, 2019

(54) COMMENTARY SYSTEMS AND METHODS

(71) Applicant: MLB Advanced Media, L.P., New York, NY (US)

(72) Inventor: Cory Schwartz, Merrick, NY (US)

(73) Assignee: MLB Advanced Media, L.P., New York, NY (US)

( * ) Notice: Subject to any disclaimer, the term of this patent is extended or adjusted under 35 U.S.C. 154(b) by 0 days.

(21) Appl. No.: 14/992,533

(22) Filed: Jan. 11, 2016

Related U.S. Application Data

(63) Continuation of application No. 13/234,127, filed on Sep. 15, 2011.

(60) Provisional application No. 61/383,229, filed on Sep. 15, 2010.

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2018.01) |
| *A63F 13/335* | (2014.01) |
| *A63F 13/32* | (2014.01) |
| *A63F 13/33* | (2014.01) |
| *A63F 13/812* | (2014.01) |
| *A63F 13/92* | (2014.01) |
| *A63F 13/25* | (2014.01) |
| *A63F 13/332* | (2014.01) |
| *A63F 13/327* | (2014.01) |

(52) U.S. Cl.
CPC ............ *A63F 13/335* (2014.09); *A63F 13/25* (2014.09); *A63F 13/32* (2014.09); *A63F 13/327* (2014.09); *A63F 13/33* (2014.09); *A63F 13/332* (2014.09); *A63F 13/812* (2014.09); *A63F 13/92* (2014.09); *A63F 2300/407* (2013.01)

(58) Field of Classification Search
CPC .............. A63F 13/00; A63F 2009/2457; A63F 2009/246; A63F 2011/0097
See application file for complete search history.

(56) References Cited

U.S. PATENT DOCUMENTS

| | | | | |
|---|---|---|---|---|
| 4,137,566 A | * | 1/1979 | Haas | .................. A63B 24/0003 273/DIG. 24 |
| 6,976,031 B1 | | 12/2005 | Toupal et al. | |
| 8,374,848 B1 | | 2/2013 | Birnbaum et al. | |
| 2002/0115046 A1 | * | 8/2002 | McNitt | .............. A63B 24/0003 434/252 |
| 2010/0048187 A1 | * | 2/2010 | Sullivan | ............. H04N 21/2187 455/414.3 |
| 2011/0054782 A1 | * | 3/2011 | Kaahui | ................ A61B 5/1107 701/532 |

* cited by examiner

*Primary Examiner* — Milap Shah
*Assistant Examiner* — Jason Pinheiro
(74) *Attorney, Agent, or Firm* — Foley & Lardner LLP

(57) ABSTRACT

Systems and methods for presenting sports data is provided. A server receives raw game data relating to a sporting event. The server determines whether the raw game data satisfies at least one predefined criterion in a plurality of predefined rules. Responsive to determining that the raw game data satisfies at least one predefined criterion in the plurality of predefined rules, the server generates game commentary data comprising text related to action occurring during the sporting event. The server provides the generated game commentary data to an electronic user device for display.

20 Claims, 2 Drawing Sheets

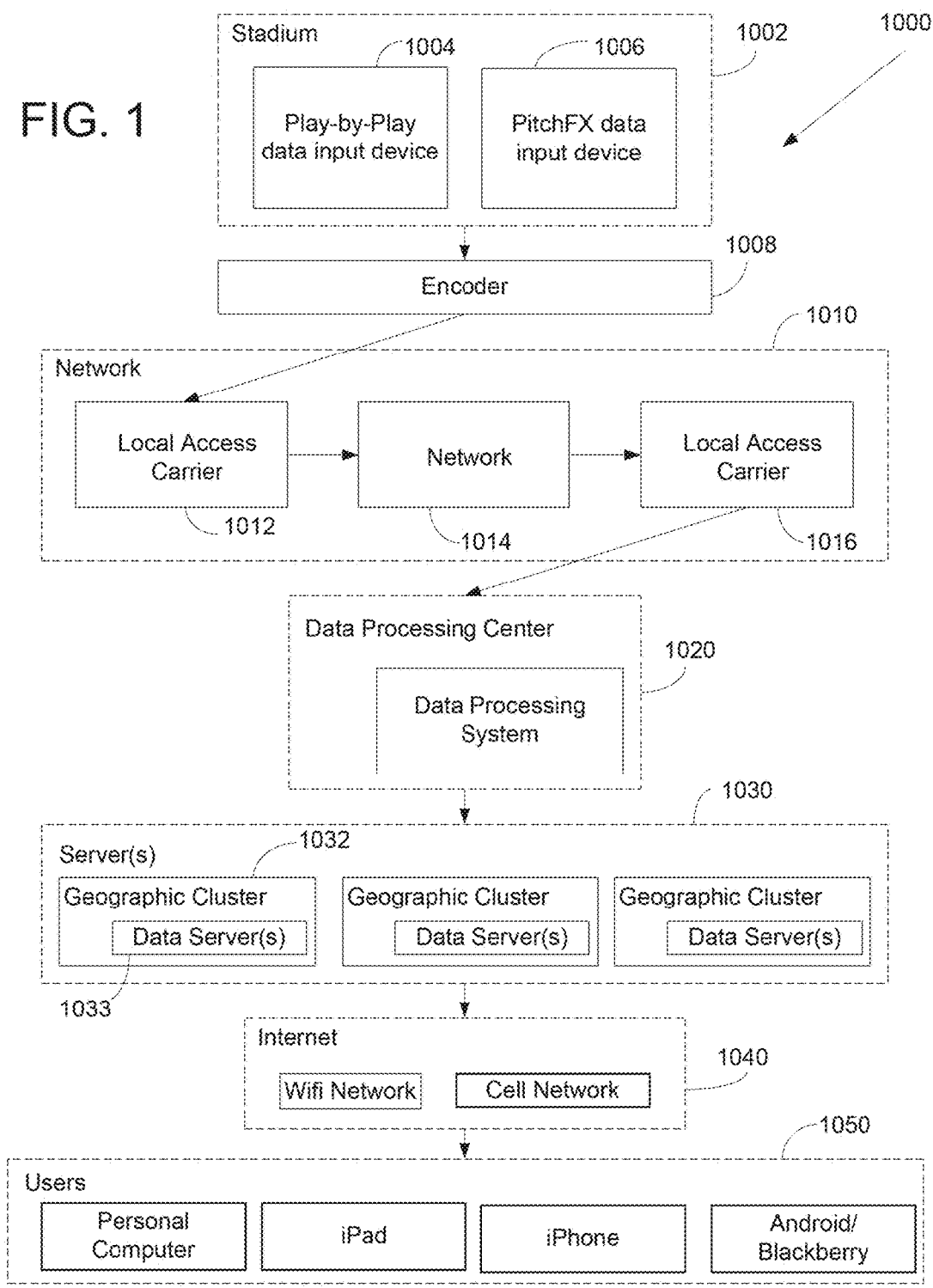

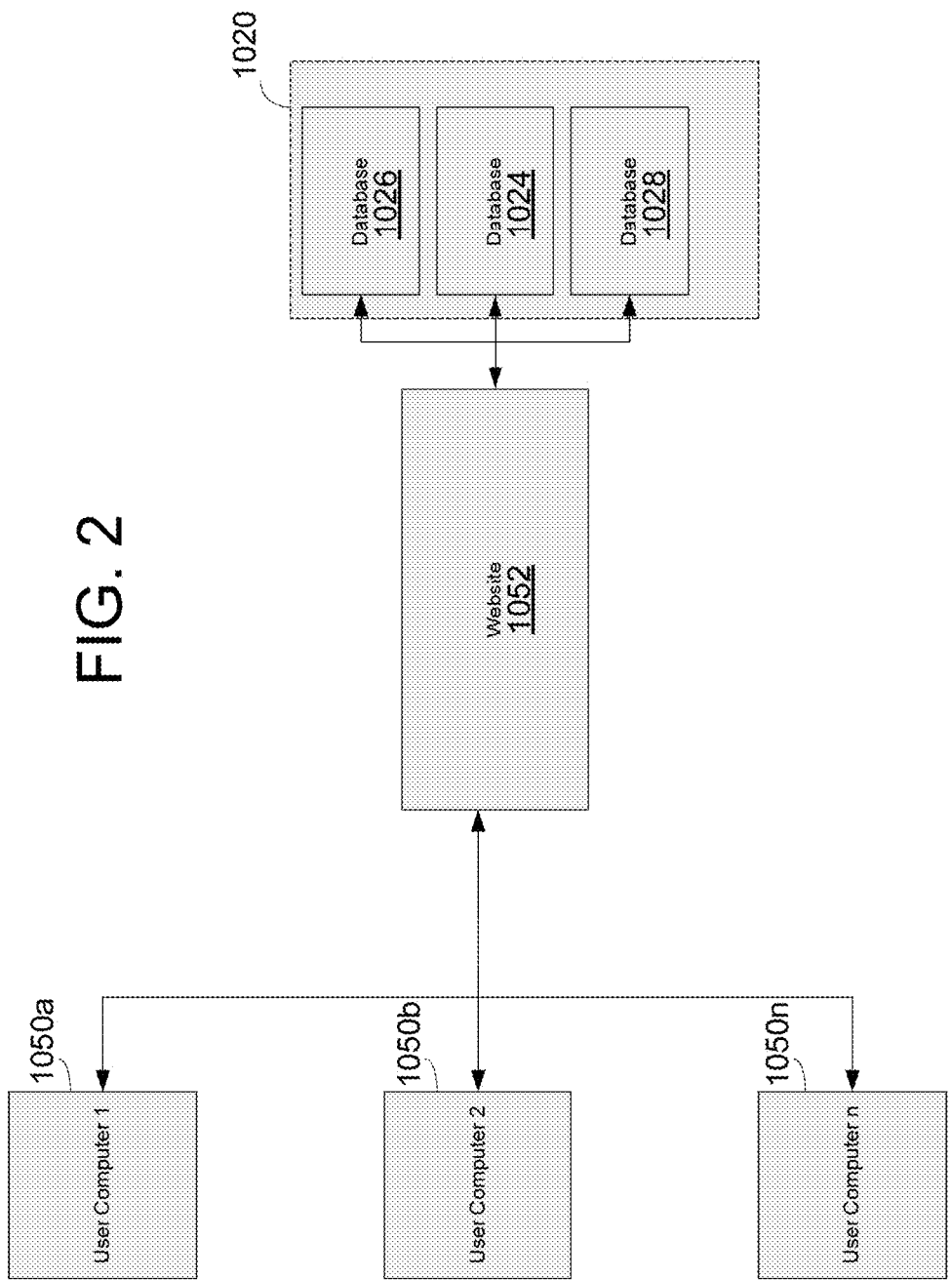

COMMENTARY SYSTEMS AND METHODS

CROSS-REFERENCE TO RELATED PATENT APPLICATIONS

This application is a continuation of U.S. application Ser. No. 13/234,127, filed Sep. 15, 2011; which claims the benefit of U.S. Provisional Application No. 61/383,229, filed Sep. 15, 2010. The disclosures of the prior applications are incorporated herein by reference in their entirety.

FIELD OF THE DISCLOSURE

Embodiments of the present invention generally relate to commentary systems and methods, and, in specific embodiments, to commentary systems and methods for enhanced commentary based at least on part of one or more business rules.

SUMMARY OF THE DISCLOSURE

A method of processing sports data may include, but is not limited to, any one or combination of: (i) receiving raw game data relating to a sporting event; (ii) receiving first game data comprising text describing action occurring during the sporting event; (iii) generating second game data based at least on the raw data and predefined rules, the second game data comprising text related to action occurring during the sporting event; and (iv) providing the first game data and the second game data to a user for display on an electronic device of the user.

In various embodiments, the method includes providing third game data to the electronic device, the third game data comprising statistical information relating to the sporting event. In various embodiments, the first game data is provided separately from the second game data. In various embodiments, the second game data is based at least on the raw game data, historical game data, and the predefined rules. In some embodiments, the historical game data comprises raw game data from a previous sporting event. In various embodiments, the raw game data comprises data captured by a data-capturing device at the sporting event. In various embodiments, the raw game data comprises data input to an electronic device by a human operator. In various embodiments, the raw game data comprises statistical information relating to the sporting event. In various embodiments, the electronic device is a mobile phone. In various embodiments, the sporting event is a baseball game.

A method of processing sports data may include, but is not limited to, any one or combination of: (i) receiving raw game data relating to a sporting event; (ii) receiving first game data comprising text describing action occurring during the sporting event; (iii) determining, based on the raw data and predefined rules, whether to provide second game data to a user for display on an electronic device of the user, the second game data comprising text related to action occurring during the sporting event; and (iv) providing, in response to determining to provide the second data, the first game data and the second game to the user for display on the electronic device of the user.

In various embodiments, the method further includes providing, in response to determining not to provide the second data, the first game data to the user for display on the electronic device of the user. In various embodiments, the second data is determined to be provided if the raw data satisfies one or more of the predefined rules. In various embodiments, the second data is determined not to be provided if the raw data does not satisfy any of the predefined rules. In various embodiments, the second data is determined not to be provided based on predetermined criteria. In various embodiments, the predetermined criteria includes at least one of a number of instances in which second game data was provided, a time since second game data was provided, and a number of instances since second game data was provided.

BRIEF DESCRIPTION OF THE DRAWINGS

FIG. 1 is a network environment according to various embodiments of the disclosure.

FIG. 2 is a generalized representation of a network environment according to various embodiments of the disclosure.

DETAILED DESCRIPTION

Various embodiments include program products comprising computer-readable media for carrying or having computer-executable instructions or data structures stored thereon. Such computer-readable media can be any available media that can be accessed by a general purpose or special purpose computer or server (e.g., 1010 in FIG. 1). By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form-of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data that cause a general-purpose computer, special purpose computer, or special purpose processing device to perform a certain function or group of functions.

In addition to a system, various embodiments are described in the general context of methods and/or processes, which may be implemented in one embodiment by a program product including computer-executable instructions, such as program code, executed by computers in networked environments. It should be noted that the terms "method" and "process" may be synonymous unless otherwise noted. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

In some embodiments, the method(s) and/or system(s) discussed throughout may be operated in a networked environment using logical connections to one or more remote computers (e.g., 1050) having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations (e.g., user computers 1050*a*, 10-50*b*, . . . , 1050*n* interacting with data processing center 1020 via internet 1040 and/or server(s) 1030 in FIGS. 1 and 2), including personal computers hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices. In various embodiments, data may be stored either in repositories and synchronized with a central warehouse optimized for queries and/or for reporting, or stored centrally in a database (e.g., dual use database) and/or the like.

An exemplary system for implementing the overall system or portions of the invention might include a general-purpose computing device in the form of a conventional computer, including a processing unit, a system memory, and a system bus that couples various system components including the system memory to the processing unit. The system memory may include read only memory (ROM) and random access memory (RAM). The computer may also include a storage medium, such as a solid state storage device and/or a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules, and other data for the computer.

Software and Web implementations of the present invention could be accomplished with standard programming techniques with rule-based logic and other logic to accomplish the various database searching steps, correlation steps, comparison steps and decision steps. It should also be noted that the words "component" or "module" as used herein is intended to encompass implementations using one or more lines of software code, and/or hardware implementations, and/or equipment for receiving manual inputs.

With reference to FIGS. 1 and 2, according to various embodiments, play-by-play commentary may be implemented as follows. A plurality of data capture and/or input devices (e.g., 1004, 1006) are provided at an MLB stadium 1002 (or other event venue) for capturing and/or inputting data during an MLB game (or other event). For instance, in particular embodiments, each MLB game has the play-by-play data of the game captured by a "stringer." The stringer is a human operator (usually present at the game) who uses a computer or other input device (e.g., 1004) to record various play-by-play information as well as other data about the game. In some embodiments, this data can be gathered (i.e., input) automatically (e.g., pitch speed can be input based on a speed reading of a pitch by a radar gun or the like).

In some embodiments, some venues include one more PitchFX data input/capture devices 1006 for capturing information about each pitch. PitchFX information is x/y/z data about each pitch which can be used to extrapolate pitch information such as speed, trajectory, type of pitch, or break. Where available, the PitchFX information can be captured through the use of various fixed cameras arranged around the stadium. In various embodiments, raw game data may include (but is not limited to) any one or combination of manually input stringer data, automatically input stringer data, PitchFX data, other forms of data relating to a sporting event (e.g., sporting event statistics (e.g., distance traveled by a hit ball, player batting average, RBI totals, etc.), sporting event conditions (e.g., temperature, humidity, etc.)), event descriptions, and/or the like. Various non-limiting examples of data collection (and/or processing thereof) are disclosed in U.S. Pub. No. 2006/0047774, which is herein incorporated by reference in its entirety.

Each stadium 1002 may be associated with an encoder 1008. The encoder may be part of the stadium 1002 or be a production truck or the like. The encoder 1008 receives various data such as video data, the data captured by the stringers, PitchFX data, and/or the like. The encoder 1008 may compress the information and transmit the information to a data processing center 1020. In particular embodiments, the encoder 1008 may transmit the information to a local access carrier 1012 (e.g., Verizon), for example, via a MPLS (Multiprotocol Label Switching) protocol for ultimate transmission to the data processing center 1020 MPLS allows for the use of public networks to create what acts like a private line.

In further embodiments, the information may be transmitted from the local access carrier 1012 to a network operator 1014, such as that run by Global Crossing. From there, the information can be transmitted to another local access carrier 1016 before being transmitted to the data processing center 1020.

Accordingly, the data processing center 1020 receives data, for example the data captured by the stringer, the PitchFX system, and/or the like. The data processing center 1020 processes the data and stores it in one or more databases (e.g., 1024, 1026, 1028). The one or more databases may include statistics (e.g., historical data) and other data relating to previous games, players, teams, venues, and/or the like. In particular embodiments, the one or more databases is used for a number of applications, including MLB Gameday (graphical depiction of live games), and statistical information provided for applications, including MLB At-Bat. The data processing center 1020 is connected to one or more servers 1030 configured to distribute data to end-users 1050.

In some embodiments, the data processing center 1020 may be associated with server clusters (e.g., 1032, 1033) located in geographically disperse areas. When a user requests information, the request is directed to a server (e.g., 1033) at the geographically nearest cluster. If the requested information is located on the server, it is provided to the end-user. If the requested file is not located on the server, the server obtains it from another server (at another geographic cluster or server at the data processing center). Accordingly, data is retrieved from the data processing center 1020.

The end-users 1050 may be using computing devices (e.g., 1050*a*, 1050*b*, . . . , 1050*n*) that access one or more of the servers (or the data processing center directly) via the internet 1040 (e.g., WiFi network, cell network, and/or the like). The computing devices may include personal computers, cell phones (e.g., iPhone, Android-based phones, Blackberry phones, and/or the like), or other computing devices, such as an iPad. The personal computers may be running play-by-play commentary software and/or accessing a website 1052 (e.g., MLB Gameday, AtBat, or the like) that implements the relevant data. Such software can provide access to (but is not limited to) scores, statistical information, player/team profiles, news, video highlights, live video, and/or the like.

Typical play-by-play commentary software, such as MLB Gameday and MLB At-Bat, generally use event-based play descriptions—for example, "Alfonso Soriano flies out to left fielder Jose Tabata." Some play-by-play systems use game commentary that is subjectively entered (i.e., manually entered) by a human being. The play-by-play data input device 1004 (such as that used by the stringer) or other input devices may be used to input such play-by-play commentary about the game. However, play-by-play information need not be gathered at the stadium. For example, a commentator could input such information at a production truck near the stadium, a video processing center, which may be (but not limited to) part of the data processing center 1020, or the like.

Various embodiments allow for enhanced play-by-play commentary for a sports event. In particular embodiments, commentary systems (e.g., on a website 1052) may be adapted to automatically create game commentary (for example in addition to event-based commentary) based at least on predefined business rules. In additional embodiments, commentary systems may use one or more data sources, such as (but not limited to), stored data information (e.g., in database 1024), live pitch-by-pitch data (e.g., in database 1026), PitchFX data (e.g., in database 1028), and/or the like. Such embodiments may help fans understand key moments during a game, such as when a batter makes a mistake by swinging at a bad pitch, or when a pitcher is likely to lose his effectiveness based on the number of pitches he has thrown, the game scenario, etc. This enhanced data may be communicated to end-users as any other type of data, for example as described earlier. The enhanced data may be transmitted with the other type of data (e.g., event-based commentary) or may be transmitted separately. The business rules may be stored and/or run at the database processing center 1020. In other embodiments, the business rules may be implemented directly on the commentary software.

In some embodiments, using the set of business rules, the commentary system may output (e.g., display) certain commentary once a certain criteria is met and (optionally) any necessary data is provided. For example, the commentary system may output the following commentary in response to a pitcher (e.g., Johan Santana), throwing his 127th pitch of the game: "Johan Santana may be out of gas, he's thrown 127 pitches and his fastball has dropped from 94 to 88-91."

In particular embodiments, the commentary may be based on additional criteria such as a pitcher with 90% or more of prestart average number of pitches has running average fastball velocity decrease in consecutive innings or for six consecutive pitches (e.g., as determined from pitch-by-pitch data).

As another example, the commentary system may output the following commentary when a pitcher (e.g., Adam Wainwright) throws his 100th pitch of the game (i.e., the criteria): That was Adam Wainwright's 100th pitch; he holds opposing hitters to a 0.200 average in the first 100 pitches and 0.250 after that."

Or, for example, after the pitcher throws three consecutive pickoff attempts (i.e., the criteria): "Roy Halladay is really trying to keep Michael Bourn close; he has 28 stolen bases in 32 attempts this season."

Other examples of sample outputs, criteria, and data needed are shown in Appendix A. Thus, in various embodiments, the business rules may be used to provide an output (e.g., color commentary) in response to a criteria being met based on one or more of stored data information (e.g., in database 1024), live pitch-by-pitch data (e.g., in database 1026), PitchFX data (e.g., in database 1028), and/or the like. In particular embodiments, the system determines whether to provide color commentary based on whether criteria have been met. For instance, if none of the criteria (e.g., as provided in Appendix A) are met, then the system may not provide any color commentary. In further embodiments, even when one or more of the criteria is met, the system may determine not to provide any corresponding color commentary based on predefined rules. For example, if the previous play in the game produced color commentary or if color commentary was provided in the last five minutes, the system would skip color commentary for the current play (if any). Throughout various embodiments, the commentary may be presented to users in any suitable form, such as (but not limited to) text, text-to-speech, audio, graphically, and/or the like.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. Such hardware, software, firmware, or any combination thereof may part of or implemented with any one or combination of the servers, databases, associated components in the system, components thereof, and/or the like. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

|   | CRITERIA | SAMPLE OUTPUT | DATA USED |
|---|---|---|---|
| 1 | Pitcher with 90% or more of per-start average number of pitches has running average fastball velocity decrease in consecutive innings or for six consecutive pitches | (pitcher name) may be out of gas, he's thrown (x) pitches and his fastball has dropped from (per-game highest fastball velocity) to (min fastball velocity over last six pitches)-(max fastball velocity over last six pitches) | Avg # of pitches for starting P, STD |
| 2 | Pitcher with 90% or more of per-start average number of pitches has running average fastball velocity increase in consecutive innings or for six consecutive pitches | (pitcher name) has thrown (x) pitches but has plenty left in the tank, maintaining his fastball between (min fastball velocity over last 10 pitches) and (max fastball velocity over last 10 pitches) | Avg # of pitches for starting P, STD |
| 3 | Pitcher throws his 100th pitch of the game | That was (pitcher name)'s 100th pitch; he holds opposing hitters to a (.xxx) average in the first 100 pitches and (.xxx) after that | |
| 4 | Batter gets hit on "loves to face" pitch type in a hot zone | (pitcher name) didn't read the scouting report; (batter name) loves (pitch type) in that zone | |
| 5 | Batter makes an out on "hates to face" pitch type in a cold zone | (pitcher name) got (batter name) to chase a (pitch type) that he doesn't like to hit | |
| 6 | Pitcher records three consecutive outs in batters' cold zones | (pitcher name) read the scouting report and is attacking the (opposing team name) hitters' weaknesses | |
| 7 | Pitcher records three consecutive outs in batters' hot zones | (pitcher name) is leaving too many pitches where (opposing team name) hitters like them, but getting away with it so far | |
| 8 | Pitcher records first two strikes in batter's hottest zone | (pitcher name) is taking a big risk if he keeps challenging (batter name) in that location | |
| 9 | Pitcher throws 2+ fastballs in an at-bat into inside strike zones (1, 4 or 7 vs. righties, 3, 6 or 9 vs. lefties) | (pitcher name) is trying to tie up (batter name) with fastballs inside, where (batter name) hits (stats) | |

-continued

| CRITERIA | SAMPLE OUTPUT | DATA USED |
| --- | --- | --- |
| 10 Pitcher throws four consecutive pitches of the same type for balls | (pitcher name) is having trouble locating his (pitch type) . . . (optionally, additional stats) | |
| 11 Pitchers' average changeup is 10+% slower than game average fastball and no less than 65% of changeups in game have been for strikes | (pitcher name) really has his changeup working; (opposing team) hitters are (x-for-x) against it in this game and (xxx) for the season | STD avg fastball per pitcher, opp hit avg vs changeups |
| 12 Pitcher throws slider, curve or splitter with runner on 3$^{rd}$ and pitch results is *B or W | (pitcher name) shows faith in (catcher name) by throwing the (pitch type) in the dirt | |
| 13 Count is 2-0 or 3-1 and batter "loves to face" fastball | Dangerous count for (pitcher name); (batter name) is a dead-red fastball hitter, with a (.xxx) OPS against them and (.000) against everything else | OPS vs fastballs |
| 14 Pitcher records more than 65% if his strikeouts (minimum five) with his "out pitch" | (pitcher name) has his out pitch working today, recording (x) of his (x) strikeouts with it so far | |
| 15 Pitcher goes to 2-0 or 3-1 to batter in 6$^{th}$ inning or later and on-deck hitter has OPS "x" higher than batter | (batter name) may sit on the (pitcher's out pitch) here, since (pitcher name) would rather go after him than on-deck hitter (on-deck hitter name) | |
| 16 Pitcher throws the same pitch type in same zone as batter got hit off last time up | (pitcher name) went back to the (pitch type) even though (batter name) hit for a (hit type) last time up | |
| 17 No runs score but all 3 outs in inning have trajectory/L | (pitcher name) wasn't fooling anyone, giving up three straight hard hit balls, but managed to put up a zero | |
| 18 Two pitches in buffer zones (zone 11-14) called strikes in same inning | (pitcher name) is getting a generous strike zone this inning from home plate ump (name) | |
| 19 Two pitches in strike zone (zones 1-9) called balls in same inning | (pitcher name) is getting squeezed this inning by home plate ump (name) | |
| 20 Pitcher reaches two-to-one fly outs to air outs ration after at least three innings | (pitcher name) has been getting the ball up so far; he has allowed (x) HR in (x) IP this year | |
| 21 Pitcher reaches two-to-one ground outs to fly outs ratio after at least three innings | (pitcher name) has (opposing team name) batters hitting the ball into the ground so far | |
| 22 At-bat starts with 0-2 count and ends in base hit or walk | (pitcher name) had (batter name) down 0-2 but could not put him away | |
| 23 At-bat starts with 3-0 count and ends in batted ball out or strikeout | (pitcher name) battled back from 3-0 to retire (batter name) | |
| 24 Pitcher throws three consecutive pickoff attempts | (pitcher name) is really trying to keep (runner name) close; he has xx SB in xx attempts this season | |

What is claimed is:

1. A method of processing sports data in a computer network, the method comprising:

storing, in a memory device, a plurality of predefined rules for generating game commentary data, each predefined rule including a predefined criterion and a corresponding predefined output, the predefined criterion identifying conditions to generate the corresponding predefined output;

receiving, by one or more servers comprising one or more hardware processors, via the computer network, raw game data relating to a current sporting event that is currently occurring, wherein the raw game data includes data captured at the current sporting event using one or more cameras;

determining, by the one or more servers, whether to provide the game commentary data based on (i) whether the raw game data satisfies at least one predefined criterion in the plurality of predefined rules, (ii) whether a previous play in the current sporting event produced any game commentary data, and (iii) whether any game commentary data was provided during a predetermined time period prior to the current time in the current sporting event;

generating, by the one or more servers, responsive to determining (i) the raw game data satisfying at least one predefined criterion in the plurality of predefined rules, (ii) the previous play in the current sporting event not producing any game commentary data, and (iii) no game commentary data being provided during the predetermined time period prior to the current time in the current sporting event, the game commentary data by applying the raw game data to the corresponding predefined output of the at least one predefined criterion, wherein the generated game commentary data comprises comments in the form of text related to action occurring during the current sporting event; and providing, via the computer network, the generated game commentary data to an electronic user device for display.

2. The method of claim 1, wherein the game commentary data is first game data, the method further comprising:

providing second game data to the electronic device for display, the second game data comprising statistical information relating to the current sporting event.

3. The method of claim 2, wherein the first game data is provided to the electronic device for display separately from the second game data provided to the electronic device for display.

4. The method of claim 2, wherein the first game data and the second game data are displayed together on the electronic device.

5. The method of claim 1, wherein the game commentary data is generated based at least on the raw game data, historical game data, and the predefined rules.

6. The method of claim 5, wherein the historical game data comprises raw game data from a previous sporting event.

7. The method of claim 1, wherein the raw game data comprises data input to an electronic device by a human operator at the current sporting event that is currently occurring.

8. The method of claim 1, wherein the raw game data comprises statistical information relating to the current sporting event.

9. The method of claim 1, wherein the electronic device is a mobile phone.

10. The method of claim 1, wherein the current sporting event is a baseball game.

11. The method of claim 1, wherein the game commentary data is first game commentary data, the method further comprising:
receiving second game commentary data comprising text describing action occurring during the sporting event;
providing, in response to determining not to provide the first game commentary data, the second game commentary data to the electronic user device.

12. The method of claim 11, wherein the first game commentary data is determined not to be provided based on at least one of a number of instances in which first game commentary data was provided, a time since first game commentary data was provided, and a number of instances since first game commentary data was provided.

13. The method of claim 1, wherein the at least one predefined criterion identifies a condition comprising a predetermine percentage.

14. The method of claim 1, wherein the at least one predefined criterion identifies a condition comprising a predetermine percentage, and wherein the generated game commentary data includes at least a first comment associated with a first player or a first team in the current sporting event and a second comment associated with a second player or a second team in the current sporting event, the second player being an opposing player of the first player, and the second team being an opposing team of the first team.

15. The method of claim 1, wherein the game commentary data is first game commentary data, the method further comprising:
determining not to provide the first game commentary data responsive to at least one of (i) the raw game data not satisfying any predefined criterion in the plurality of predefined rules, (ii) the previous play in the current sporting event producing game commentary data, or (iii) game commentary data being provided during the predetermined time period prior to the current time in the current sporting event;
receiving second game commentary data comprising text describing action occurring during the sporting event; and
providing, in response to determining not to provide the first game commentary data, the second game commentary data to the electronic user device for display.

16. A system of processing sports data in a computer network, comprising:
one or more servers comprising one or more hardware processors configured to:
store, in a memory device, a plurality of predefined rules for generating game commentary data, each predefined rule including a predefined criterion and a corresponding predefined output, the predefined criterion identifying conditions to generate the corresponding predefined output;
receive via the computer network, raw game data relating to a current sporting event that is currently occurring, wherein the raw game data includes data captured at the current sporting event using one or more cameras;
determine whether to provide the game commentary data based on (i) whether the raw game data satisfies at least one predefined criterion in the plurality of predefined rules, (ii) whether a previous play in the current sporting event produced any game commentary data, and (iii) whether any game commentary data was provided during a predetermined time period prior to the current time in the current sporting event;
generate, responsive to determining (i) the raw game data satisfying at least one predefined criterion in the plurality of predefined rules, (ii) the previous play in the current sporting event not producing any game commentary data, and (iii) no game commentary data being provided during the predetermined time period prior to the current time in the current sporting event, the game commentary data by applying the raw game data to the corresponding predefined output of the at least one predefined criterion, wherein the generated game commentary data comprises comments in the form of text related to action occurring during the current sporting event; and
provide, via the computer network, the generated game commentary data to an electronic user device for display.

17. The system of claim 16, wherein the game commentary data is generated based at least on the raw game data, historical game data, and the predefined rules.

18. The system of claim 17, wherein the historical game data comprises raw game data from a previous sporting event.

19. The system of claim 16, wherein the game commentary data is first game commentary data, and the one or more servers are further configured to:
receive second game commentary data comprising text describing action occurring during the sporting event;
provide, in response to determining not to provide the first game commentary data, the second game commentary data to the electronic user device.

20. The system of claim 19, wherein the first game commentary data is determined not to be provided based on at least one of a number of instances in which first game commentary data was provided, a time since first game commentary data was provided, and a number of instances since first game commentary data was provided.

* * * * *